Sept. 23, 1969  S. D. DE LAJARTE ET AL  3,468,649
METHOD AND APPARATUS FOR PRODUCING FLAT GLASS
Filed July 13, 1965  3 Sheets-Sheet 2
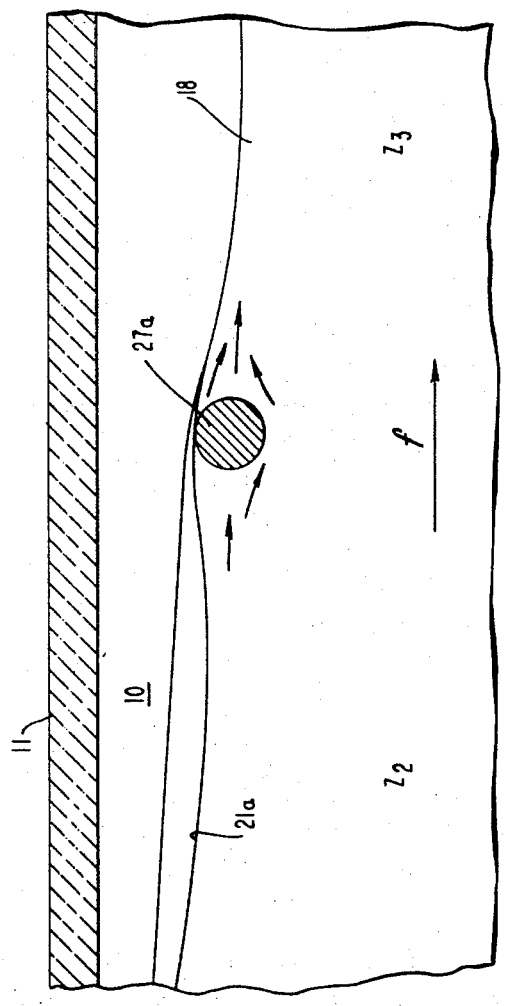
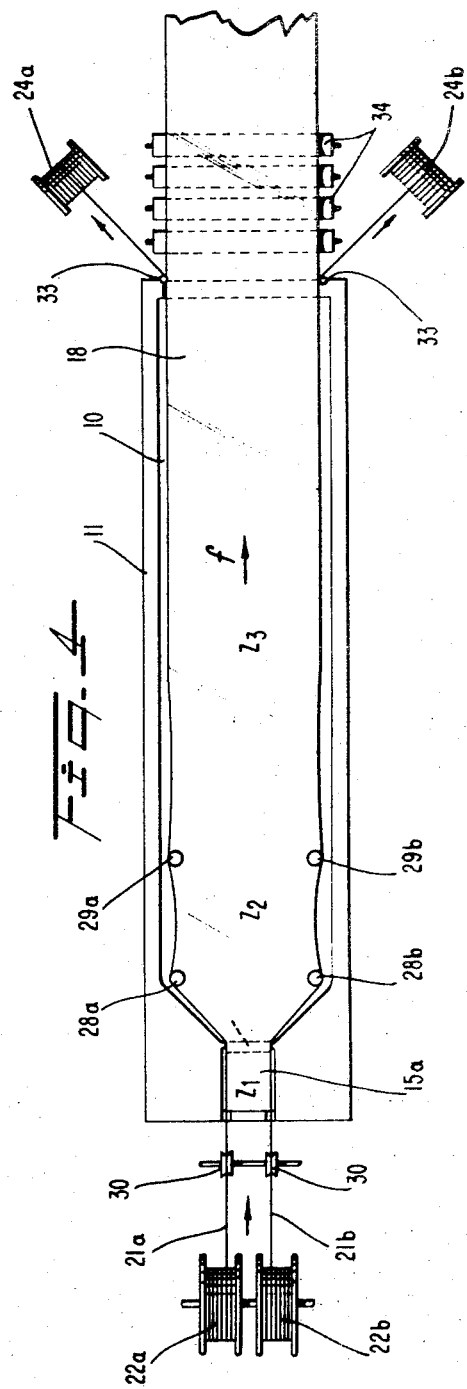
INVENTORS
STEPHANE DUFAURE De LAJARTE
BY MAURICE BOURGEAUX
*Bauer and Seymour*
ATTORNEYS

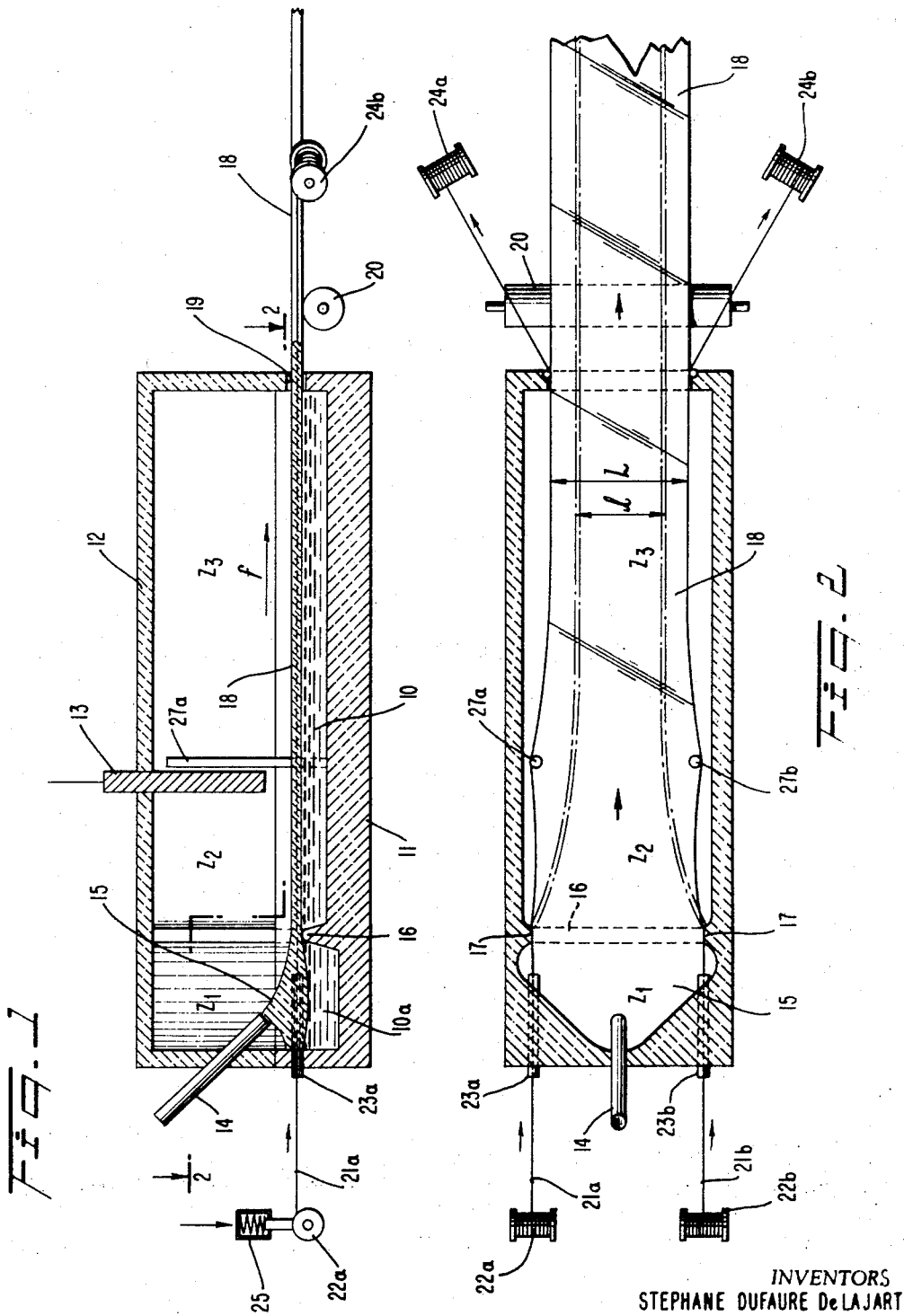

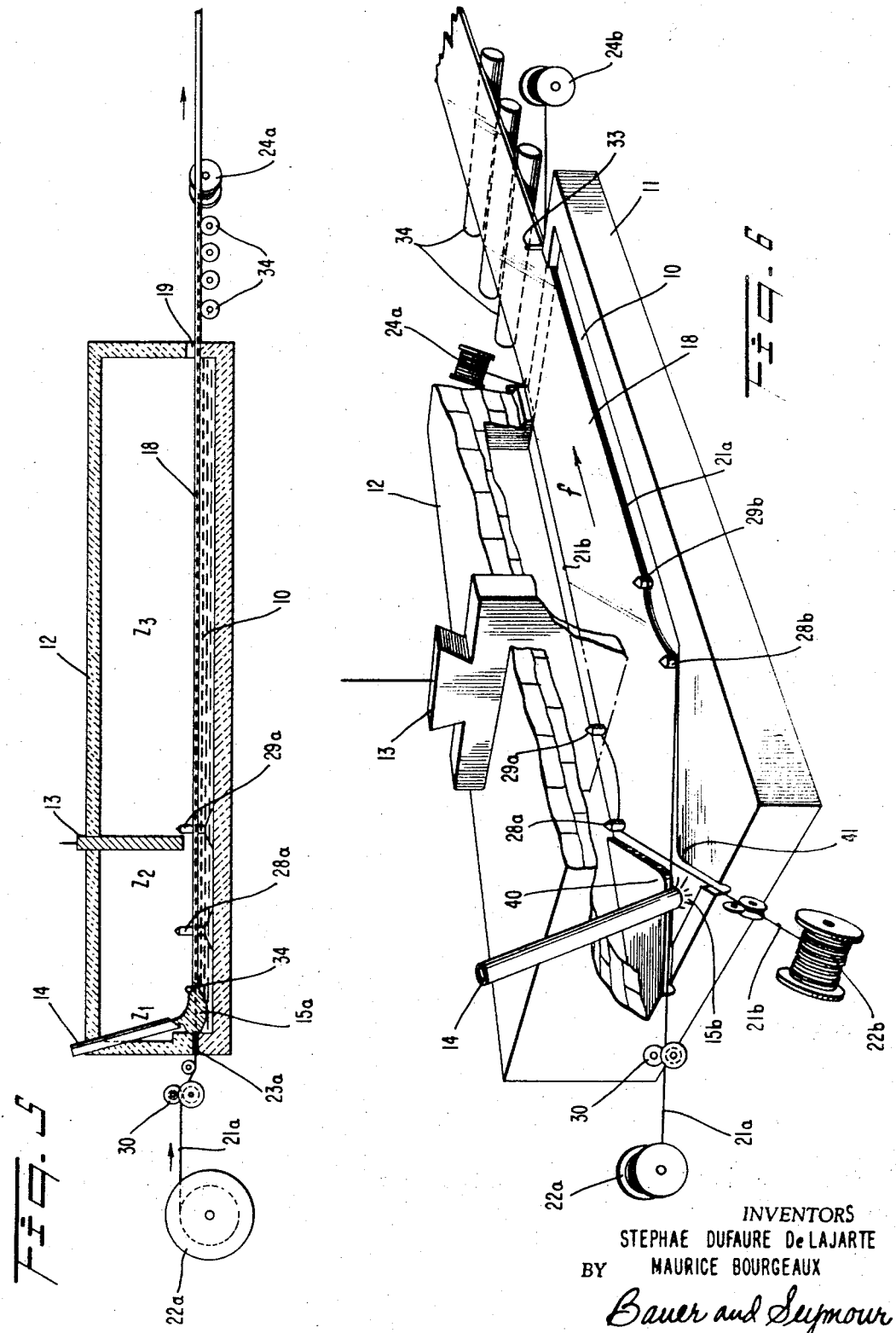

3,468,649
METHOD AND APPARATUS FOR PRODUCING
FLAT GLASS
Stephane Dufaure De Lajarte, and Maurice Bourgeaux,
Paris, France, assignors to Compagnie de Saint-Gobain,
Neuilly-sur-Seine, France
Continuation-in-part of application Ser. No. 442,942,
Mar. 26, 1965. This application July 13, 1965, Ser.
No. 471,642
Claims priority, application France, July 17, 1964,
982,130; Apr. 23, 1965, 14,433
Int. Cl. C03b 18/00
U.S. Cl. 65—91                                    11 Claims

ABSTRACT OF THE DISCLOSURE

Molten glass is poured onto the surface of a bath of molten tin, forming a pool, a glass sheet is drawn horizontally from the pool being formed at the downstream limit of the pool over a bar which determines its initial thickness. The sheet is prevented from retracting to stabilized thickness under the forces of surface tension and gravity by embedding in its edges wires which are held in predetermined spaced relation by a series of fixed guides which pass inside the wires and through the glass sheet as it progresses downstream.

---

This case claims the priority of French application No. 982,130 of July 17, 1964 and No. 14,433 of Apr. 23, 1965.

This is a continuation-in-part of copending U.S. patent application No. 442,942, now Patent Number 3,413,107, filed Mar. 26, 1965.

The present invention relates to the manufacture of flat glass by the flotation process in which the glass sheet is floated on the surface of a liquid bath, usually of molten metal, while the glass is sufficiently fluid to allow the surface to remove blemishes by the subsidence and flattening of minute irregularities and to acquire a fire polish.

In accordance with the general method under consideration, a sheet of glass is drawn over the surface of a bath of molten metal in a tank. The sheet is initially formed by drawing molten glass from a pool or other supply through a forming passage defined by spaced apart abutments or protruding portions of the side walls of the tank. The sheet is progressively cooled to handling temperature as it is drawn over the bath and is drawn off the surface of the bath by driven rollers which grip or otherwise exert pulling pressure on the cooled portion of the sheet. As the sheet is drawn through the forming passage, the glass is in molten fluid condition and tends to assume a state, called dimensionally stabilized, under the twin forces of surface tension and gravity. Glass which is left free usually stabilizes at about 6.5 mm. thick when the bath is molten tin or an alloy of tin. If the molten glass is laid on the bath in a thinner sheet it tends to thicken and shrink laterally. Conversely, if it is laid on the bath in a thicker sheet it has a tendency to flatten out and spread laterally.

The above copending application provides a method and apparatus for establishing and maintaining the lateral dimensions of the sheet of glass after it has emerged from the forming passage and as it is drawn over the surface of a liquid bath and cooled. In accordance with the invention disclosed therein the sheet of glass emerging from the forming passage is wider than the width desired in the finished product, which as referred to herein, is the sheet when it has cooled to handling temperature at which it retains its previously established dimensions. The molten portion of the sheet emerging from the forging passage is then subjected to longitudinal tension by a combination of retarding means provided at the forming passage, to the pull exerted on the cooled portion of the sheet to draw retard the flow of molten glass through the passage and the sheet across the bath. This longitudinal tension stretches the sheet causing it to become thinner. At the same time, the surface tension of the glass exerts a lateral contracting force tending to narrow the sheet. In accordance with the invention of the copending application, the lateral contraction is restrained by flexible guide elements, such as wires, under tension which are continuously introduced into the molten glass emerging from the forming passage and drawn across the bath along with the sheet. The guide elements are tensioned and drawn across the surface of the bath in parallel relation spaced apart the width desired for the finished sheet and are made of material, such as iron or steel wire, which is wetted by the glass. When the molten sheet is stretched, which causes lateral contraction, the edges of the sheet adhere to the guide elements by capillary adhesion and the sheet is restrained from shrinking laterally so that it is made thinner as a result. When the sheet has cooled to handling temperature, at which it has hardened sufficiently to retain the dimensions established in the molten sheet, the guide elements are removed by pulling them out from the edges of the sheet.

Objects of this invention are to improve upon the method and apparatus disclosed in the above copending application by providing means for exerting greater resistance to lateral contraction of the molten sheet and for stretching the molten sheet laterally, thereby making it possible to further reduce the thickness of glass sheets.

Another object is to reduce the thickness of glass sheets formed by the flotation process by laterally stretching the sheets while they are in molten condition on the liquid supporting bath, thereby eliminating the necessity for thinning the sheets with calender rolls or other mechanical means.

Another object is to produce a thin sheet of glass by drawing the glass from a pool of molten glass formed on a bath of liquid metal and stretch it laterally and longitudinally to the desired thinness while it is in molten condition floating on the bath whereby blemishes are removed from the surface, and the surface is made smooth, by the subsidence and flattening of minute irregularities.

The objects of the present invention are accomplished generally by a method of forming sheet glass which comprises forming a pool of molten glass on the surface of a body of molten metal, drawing a sheet of molten glass from the pool in a predetermined path over the body of molten metal, causing the sheet of molten glass to be stretched laterally so as to have a greater width, and hence be thinner, than a freely stabilized sheet, and then maintaining the sheet in stretched condition while cooling it to handling temperature as it is drawn over the surface of the body of molten metal.

In accordance with this invention molten glass is poured onto the liquid metal bath in a pool, a pair of flexible guide elements are introduced into the pool and are drawn along with a sheet of molten glass from the pool in a predetermined path over the molten metal bath. As the guide elements emerge from the pool they are passed around separating members which are spaced apart across the path of the glass sheet an amount approximately equal to the width desired in the finished sheet which is an amount greater than the width the sheet would have if freely stabilized. The separating members may be posts, pegs or hooks mounted in the tank containing the bath of molten metal. In one form of the invention, the molten sheet is stretched longitudinally and the guide elements passing around the separating members resist lateral shrinkage of the molten sheet. In another form, the separating members are spaced so that the guide elements diverge from the point at which they emerge from the pool along with the sheet and thus stretch the sheet laterally while it is drawn from the pool. In both forms, the sheet is caused to be stretched laterally and thereby made thinner. The guide elements are under tension and are maintained in substantially parallel relation as they are drawn past the separating members along with the sheet so that the sheet is held in laterally stretched condition while it is cooled to handling temperature.

The tension which it is possible to apply to the guide elements to resist lateral shrinkage of, or to laterally stretch, the sheet of molten glass is limited by the mechanical strength of the elements at the elevated temperatures (in the order of 1000° C. to 1100° C.) of the molten glass and this mechanical strength in turn depends upon the material of the elements, their form and the length of the unsupported span over which they must resist the sidewise pull of the glass. When the guide elements are iron or steel wires having a diameter of about a millimeter, their resistance to breakage is quite low and does not exceed a few hundred grams per square millimeter. Due to the limit of the tension which can be applied to the guide elements some lateral contraction of the sheet is unavoidable and the longer the span of the molten glass the less able the guide elements are to resist contraction. It is desirable to resist the lateral contraction, not only as a means of thinning the sheet, but also because the thickening caused by the contraction is uneven so that the surfaces of the sheet are not smooth and parallel.

The provision of the separating members to separate and support the guide elements in the portion of the sheet which is molten in accordance with this invention makes the use of guide elements more effective for resisting lateral contraction of the sheet and makes it possible to utilize the guide elements for laterally stretching the molten sheet and thereby produce thinner sheets.

When a glass sheet is drawn in accordance with this invention, the separating members, around which the guide elements pass, are in the path of the sheet and the molten glass of the moving sheet must flow around them. The guide elements are at the edges of the sheet respectively as they pass around the separating members and, rather surprisingly, the interference with the flow of glass in the sheet by the separating members and the tension and movement of the guide elements do not strip the guide elements from the sheet, as might be expected. The separating members are located at a point along the path of the sheet at which the glass is at a high temperature (a minimum of about 900° C.). It is, of course, in fluid condition. As the guide elements pass around the separating members the glass sheet is parted by the separating members but the viscosity of the glass at that point is low and the glass tends to stick to the guide elements by capillary attraction so that the parted glass comes together beyond the separating members and the guide elements readhere to the edges of the body of the sheet.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIGURE 1 is a view in vertical longitudinal section through one form of apparatus in acccordance with the invention;

FIGURE 2 is a top plan view of a horizontal section through the apparatus of FIGURE 1 along the line 2—2 of FIGURE 1;

FIGURE 3 is a top plan view partly in section, in enlarged scale, of one of the separating members and illustrating the flow of glass as a guide element in a glass sheet passes around it in accordance with the invention;

FIGURE 4 is a top plan view of a horizontal section through another form of apparatus in accordance with the invention showing a pair of separating elements at each side of the drawn sheet;

FIGURE 5 is a vertical longitudinal section through the apparatus of FIGURE 4; and FIGURE 6 is a perspective view, partly broken away, of still another form of apparatus in accordance with the invention and showing the guide elements crossing each other at the point at which they are drawn from the pool of molten glass along with a sheet of the glass.

Looking at FIGURES 1 and 2 of the drawings, a bath 10 of molten metal, such as tin or an alloy of tin, is contained in a tank 11 which is heated by conventional means such as burners. A refractory dome 12 covers the tank and a vertically adjustable baffle 13 enters through a slot in the dome and separates the upper portion of the interior of the apparatus into an upstream section to the left of the baffle and a downstream section to the right thereof.

Molten glass from a melting furnace of ordinary type, not shown, is conducted by a tube 14 through the end of the dome 12 and deposited in a pool 15 on the surface of the molten metal bath 10. The pool 15 is formed on a portion 10a of the bath retained behind a dam 16 which extends across the tank between projections 17 from opposite sides of the tank which define a forming passage through which molten glass from the pool 15 is drawn as a sheet 18 across the surface of the bath 10. The sheet being formed passes over the dam 16 which retards the flow of the glass for purposes subsequently described. From the forming passage at the pool 15 the glass sheet is drawn over the surface of the bath 10 in the direction indicated by the arrow $f$ and out through an orifice 19 in the right end of the tank and onto a driven roller 20 which operates to draw the sheet 18 from the pool and across the bath and conveys the sheet on to further steps such as final cooling and cutting.

The temperature inside the apparatus is controlled by suitable means such as burners, not shown, in the walls of the dome 12 over the tank. The molten glass as it is deposited in the pool 15 by the tube 14 is at a temperature of about 1150° C. In the zones designated $Z_1$ and $Z_2$ (at the pool 15 and between the pool and the baffle 13, respectively) in the upstream portion of the apparatus, the temperature is maintained between about 950° C. to about 1000° C. at which the glass in the pool 15 and in the portion of the sheet between the pool and the baffle 13 are in molten fluid condition. At this temperature the sheet is capable of being drawn or stretched to its final thickness, capable of self-leveling its surface and of fire polishing.

After the sheet moves to the left of the baffle 13, it is gradually cooled to handling temperature (about 500° C.) as it leaves the tank through orifice 19. Handling temperature as referred to herein is the temperature at which the glass sheet has congealed or hardened sufficiently to be handled without damage and at which its dimensions are stable. To cool the sheet in zone 3 of the apparatus the temperature is progressively reduced from about 900° to 950° C. at the baffle 13 to from about 400° to 600° C. at the orifice 19. This reduction in temperature is suitably accomplished by progressively reducing the number of burners or other heating elements along the downstream portion of the dome 12.

In accordance with the invention a pair of flexible guide elements 21a and 21b are introduced into the molten glass in the pool 15 and are drawn along with the sheet 18 across the bath 10 and out the orifice 19. The guide elements 21 may be wires, chains, belts or the like which are wetted by the glass and are suitably wires of iron or steel about 1 mm. in diameter. The guide elements 21a–21b are fed from supply reels 22a and 22b into the pool 15 through spaced apart tubular passages 23a and 23b in the tank wall and after being drawn across the surface of the bath 10 in the tank 11 are rolled up on take-up reels 24a and 24b which are angularly offset from the orifice 19 outside the tank. The take-up reels 24a and 24b are driven as the means to draw the guide elements through the apparatus and brakes, indicated schematically at 25, on the supply reels 22a–22b are used to put the guide elements under tension. The drawing speed of the guide elements 21a–21b, and of the glass sheet 18 is suitably about 3 m. per minute and the tension applied to each of the guide elements, for purposes subsequently described, is about 500 grams.

As seen in FIGURE 2, the guide elements 21a–21b are drawn along with, and embedded in, the sheet of molten glass from the pool 15 and are passed around separating members 27a and 27b, which are spaced apart across the path of the sheet 18. The separating members 27a and 27b are at the edges of the tank 11 and may be rods, posts or pegs secured to the bottom of the tank to extend above the surface of the bath 10 or rings or hooks secured to the walls of the tank, for example. The separating members are spaced apart an amount substantially equal to the width it is desired to have the finished sheet and are at the point along the path of the glass sheet 18 at which the glass is molten and in fluid condition. As shown in FIGURES 1 and 2, the separating elements 27a and 27b are at the dividing line between zones $Z_2$ and $Z_3$ at the downstream side of baffle 13.

As the sheet 18 is drawn from the pool 15 over the dam 16 it is subjected to longitudinal tension by the pulling pressure exerted by the roller 20 on the cooled portion of the sheet in combination with the retarding effect of the dam 16 on the flow of glass from the pool 15. The molten portion of the sheet 18 in zone $Z_2$ is therefore stretched longitudinally. This reduces the thickness of the sheet to an extent such that the surface tension of the glass tends to contract the sheet laterally to return it to a dimensionally stabilized thickness. If the sheet were thus stretched longitudinally and the guide elements 21a and 21b are separating members 27a and 27b were not applied in accordance with the present invention, the sheet would normally be contracted laterally to approximately the narrower width indicated by the dash lines 1.

In accordance with this invention, however, the guide elements 21a and 21b moving with the sheet 18 under tension and passing around the separating members 27a and 27b resist the lateral shrinkage and hold the edges of the sheet 18 so that it is stretched to the width L. The surface tension of the glass and the lateral contraction it produces cause the guide elements to curve in slightly as indicated in the drawing, but the inward curvature would be much greater, and the sheet would be much narrower, but for the support provided by the separating elements. It has been estimated that in the absence of the separating elements the width of the finished sheet would be about 30 to 50% less than the width L. Thus by stretching the sheet laterally in the manner described, a much thinner sheet is produced.

As shown in FIGURE 3, when the guide elements 21a (and 21b) pass around the separating members 27a (and 27b) in the direction indicated by arrow f the sheet of molten glass parts and comes together again around the separating members as indicated by the unmarked arrows. The glass adheres to the guide members and they remain adhered to the sheet despite the movement around the separating members.

In the embodiments shown in FIGURES 4, 5 and 6, two pairs of separating members 28a and 28b and 29a and 29b are spaced apart across the path of the sheet 18. They are similar in structure and function to the separating members 27a and 27b of FIGURES 1, 2 and 3. In this embodiment, however, the pool of molten glass 15a is considerably narrower than the body of the bath 10 and the sheet 18, as it emerges from the pool 15a is narrower than the width intended for the finished sheet. The first pair of separating members 28a and 28b are spaced apart an amount representing the desired width of the finished sheet and the guide elements 21a and 21b, being drawn from the pool 15a along with the sheet 18, diverge to pass around the respective separating members 28a and 28b. This divergence stretches the width of the sheet 18 from its original width and thereby reduces its thickness. The guide elements are then drawn in parallel relation, passing around the second pair of separating members 29a and 29b which provide additional support for the guide elements to resist lateral contraction of the sheet. The first pair of separating members 28a and 28b are across a portion of the path of the sheet 18 in the zone $Z_1$ and the other pair 29a–29b are at the line between zones $Z_2$ and $Z_3$. The glass of the sheet is molten at both these points.

In the embodiment illustrated in FIGURES 4 and 5, the tension is applied to the guide elements 21a and 21b by the driven take-up reels 24a and 24b and brakes 30 and 31 adjacent the supply reels 22a and 22b respectively. As shown, the outer edges of the orifice 19 are provided with guard pieces 33 to assist the passage of the guide elements around the edges of the orifice and prevent damage to the edges and to the guide elements.

As the cooled portion of the sheet 18 passes out through the orifice 19, it is received on a train of rollers 34, one of which is driven as the means for drawing the sheet 18 across the bath 10. Means for restraining the flow of glass from the pool 15a as it is drawn into the sheet 18 is provided by a bar or roller 35 which is suitably made of refractory material wetted by the glass. The roller 35 is spaced above the bath 10 and in contact with the glass being drawn into a sheet 18 from the pool 15a. The roller 35 also serves to thin the flow of glass thereunder. In practice the thickness of the glass at the pool side of the roller 35 is between about 15 and 20 mm. The roller thins the stream of glass flowing thereunder into the sheet 18 and restrains it so that the pull exerted on the cooled portion of sheet 18 by the rollers 34, or the one of them which is driven stretches the sheet longitudinally. The divergence of the guide elements 21a and 21b stretches the sheet laterally. This stretching, particularly the lateral stretching, thins the sheet and the guide elements 21a and 21b being drawn in spaced apart parallel relation along with the sheet through the cooling zone $Z_3$ hold the sheet in stretched condition until it is cooled. Thereafter, the guide elements are pulled from the edges of the sheet as they are drawn obliquely away from the sheet and wound on the take-up reels 24a and 25b. Sheets of glass 3 mm. thick have been produced in this manner.

A further illustrative embodiment of the invention is illustrated in FIGURE 6. In this embodiment the guide elements 21a and 21b are conducted into the pool 15b through passages 38 and 39 in the wall of the tank so as to cross in the pool and diverge to the separating members 28b and 28a respectively as they are drawn out of the pool. Projecting portions 40 and 41 from the sides of the tank define a forming passage between the pool 15b and the main portion of the tank which is narrower than the body of the pool. The guide elements cross in this passage and provide means to restrain the flow of molten glass from the pool 15b through the passage as it is drawn into a sheet 18. This restraint in conjunction with the pull on the sheet exerted by the rollers 34, or the one of them which is driven, causes longitudinal tension to be applied to the sheet so as to stretch and thin the molten portion of the sheet in the previously described manner. The molten portion of the sheet 18 is stretched lateraly to thin it by the divergence of the guide elements 21a and 21b in the same manner as described with reference to the embodiment of FIGURES 4 and 5. Also as in the previous embodiments the sheet 18 is held in stretched condition by the tension of the guide elements 21a and 22b as they are drawn along with the sheet 18 over the bath 10 through the cooling zone between the baffle 13 and orifice 19 in which the sheet 18 is cooled to handling temperature.

An example of glass which may be formed into thin sheets in accordance with the method and apparatus of this invention is an ordinary type of window glass having the following composition:

| | |
|---|---:|
| $SiO_2$ | 70.50 |
| CaO | 11.0 |
| $Na_2O$ | 14.0 |
| MgO | 3.0 |
| $Al_2O_3$ | 1.10 |
| $Fe_2O_3$ | 0.10 |
| $SO_3$ | 0.23 |
| $K_2O$ | 0.07 |

What is claimed is:

1. In a method of forming sheet glass wherein a fluid glass sheet is drawn over the surface of a flotation bath through zones which fire polish the sheet, establish its dimensions, and cool it to handling temperature, the steps which comprise forming a pool of molten glass on the surface of a body of molten metal, drawing a pair of flexible guide elements which are wetted by said molten glass into the pool in predetermined spaced relation, drawing the guide elements along with, and embedded in, molten glass from the pool in a predetermined path over the body of molten metal into contact with sheet forming means, thereby forming a sheet in which the guide elements are embedded, and laterally extending the sheet to dimensions greater than those of stability by subjecting the guide elements to lateral tension by passing them outside and in contact with spacing members in the zone wherein the glass is fluid and cooling the sheet in its enlarged dimensions to a temperature at which its dimensions are fixed and it is capable of being handled by ordinary handling means without damage.

2. The method of claim 1 including braking the sheet of molten glass as it is withdrawn from the pool and exerting a pull on the cooled portion of the sheet in a direction away from the pool, thereby subjecting the sheet to longitudinal tension.

3. The method of claim 1 in which the sheet and guide elements are drawn from said pool through a laterally defined passage narrower than the width of the cooled sheet, and in which the guide elements are caused to diverge by the lateral tension to such width as they emerge from said passage.

4. The method of claim 1 in which spacing members for the guide elements are disposed in pairs on each side of the ribbon of glass in the downstream portion of the hottest part of the furnace, and pass through the sheet of molten glass as it moves downstream, the glass being reunited with the guide elements therebeyond.

5. The method of claim 1 in which spacing members for the guide elements are disposed in pairs on each side of the ribbon of glass and a pair is in the upstream portion of a zone in which the glass is cooled.

6. The method of claim 1 in which the lateral tension is exerted from positions substantially equal to the distance between the moving guides at the upstream end of the sheet forming zone.

7. The method of claim 1 in which the lateral tension is exerted from positions greater than the distance between the guide elements where they leave the sheet forming zone.

8. In a glass furnace comprising a tank having successive temperature zones in which the glass is first fluid and finally hardened enough to resist surface damage, means to form a sheet of glass and move it along the tank comprising a flotation bath and means to form a pool of glass thereon, flexible linear edge guide means embedded in the glass of the pool and in the edges of the sheet formed therefrom and to move with the sheet, means to apply lateral tension to the edge guide means in the zone of glass fluidity, comprising spacing elements constructed and arranged to project through the glass sheet within and in contact with the flexible edge guide means, whereby the sheet is laterally tensioned in its fluid state.

9. Sheet forming apparatus according to claim 8 comprising a tank for holding a body of molten metal, means for delivering molten glass to a portion of the surface of molten metal in the tank to form a pool thereon, a pair of flexible guide means, means for conducting said guide means into said pool, means for drawing said guide means embedded in molten glass from said pool in a predetermined path over the surface of said molten metal, means to form the guided glass into a sheet, means operable on the guide means to apply lateral tension to said sheet of molten glass, comprising spacing elements for maintaining the guide means substantially in selected spaced relation as they are drawn along with said sheet over the surface of said molten metal, and means for cooling said sheet to handling temperature thereafter.

10. The apparatus of claim 9 in which said flexible guide means are metallic.

11. The apparatus of claim 9 including means for drawing the guide means through the tank under tension, spaced conduits through which the guide means are drawn into the tank, and said spacing elements comprising laterally spaced post members projecting through the glass sheet around which the guide means pass.

References Cited

UNITED STATES PATENTS 2,986,843 6/1961 Loukomsky.
3,186,813 6/1965 Pfaender.
3,215,516 11/1965 Pilkington.
3,326,653 6/1967 Lajarte et al.

S. LEON BASHORE, Primary Examiner
E. R. FREEDMAN, Assistant Examiner

U.S. Cl. X.R.
65—99A, 65A, 182